(12) United States Patent
DeWaard

(10) Patent No.: US 8,470,183 B2
(45) Date of Patent: Jun. 25, 2013

(54) SYSTEMS AND METHODS FOR EXTRACTING SAND FROM RAW SLURRY MATERIAL

(75) Inventor: Dave DeWaard, Lynden, WA (US)

(73) Assignee: Daritech, Inc., Lynden, WA (US)

( * ) Notice: Subject to any disclaimer, the term of this patent is extended or adjusted under 35 U.S.C. 154(b) by 270 days.

(21) Appl. No.: 12/917,728

(22) Filed: Nov. 2, 2010

(65) Prior Publication Data

US 2011/0100930 A1    May 5, 2011

Related U.S. Application Data

(60) Provisional application No. 61/258,467, filed on Nov. 5, 2009.

(51) Int. Cl.
*B01D 21/24* (2006.01)
*B65G 33/12* (2006.01)

(52) U.S. Cl.
CPC ............ *B01D 21/2461* (2013.01); *B65G 33/12* (2013.01)
USPC ........... 210/803; 210/523; 210/524; 198/666; 198/676; 198/677

(58) Field of Classification Search
USPC ....... 210/803, 523, 524, 532.1, 541; 198/657, 198/662, 666, 676, 677
See application file for complete search history.

(56) References Cited

U.S. PATENT DOCUMENTS

| | | | |
|---|---|---|---|
| 683,826 A | 10/1901 | Wells | |
| 992,629 A * | 5/1911 | Akins | 210/523 |
| 1,993,214 A | 3/1935 | Hass | |
| 2,066,479 A | 1/1937 | MacIsaac | |
| 2,630,906 A * | 3/1953 | Philipp | 198/666 |
| 2,680,602 A | 6/1954 | Nelson et al. | |
| 2,747,741 A | 5/1956 | Jacobson | |
| 2,982,411 A | 5/1961 | Fontein | |
| 3,333,700 A | 8/1967 | Coleman | |
| 3,606,945 A | 9/1971 | Watson et al. | |
| 3,730,887 A | 5/1973 | Suzuki et al. | |
| 3,736,111 A | 5/1973 | Gardner et al. | |
| 3,736,120 A | 5/1973 | Tempe | |
| 3,761,237 A | 9/1973 | Jeffreys | |
| 3,773,659 A | 11/1973 | Carlson et al. | |

(Continued)

FOREIGN PATENT DOCUMENTS

| CA | 2719630 | 5/2011 |
|---|---|---|
| CA | 2732065 | 8/2011 |

(Continued)

*Primary Examiner* — Christopher Upton
(74) *Attorney, Agent, or Firm* — Michael R. Schacht; Schacht Law Office, Inc.

(57) ABSTRACT

The present invention may be embodied as a processing system for processing raw slurry material. The processing system comprises a barrel member, at least one pre-processing member, and a plurality of separator members. The at least one pre-processing member and the plurality of separator members are supported by the barrel member, and the plurality of separator members define at least one separator gap. As the barrel member rotates about the processing axis A, the at least one pre-processing member transports at least a portion of the raw slurry material from the feed portion to the separator portion through the pre-processing portion. The plurality of separator members transport at least a portion of the raw slurry material from the pre-processing portion to the outlet opening through the separator portion.

35 Claims, 12 Drawing Sheets

U.S. PATENT DOCUMENTS

| | | | | |
|---|---|---|---|---|
| 3,982,499 | A | 9/1976 | Frankl | |
| 4,121,539 | A | 10/1978 | Moore | |
| 4,160,724 | A | 7/1979 | Laughton | |
| 4,192,745 | A * | 3/1980 | Hood | 210/523 |
| 4,193,206 | A | 3/1980 | Maffet | |
| 4,315,821 | A | 2/1982 | Climenhage | |
| 4,364,831 | A * | 12/1982 | Burns et al. | 210/523 |
| 4,416,764 | A * | 11/1983 | Gikis et al. | 210/803 |
| 4,460,470 | A | 7/1984 | Reimann | |
| 4,608,157 | A | 8/1986 | Graves | |
| 4,701,266 | A * | 10/1987 | Janka et al. | 210/803 |
| 4,849,105 | A | 7/1989 | Borchert | |
| 5,098,572 | A | 3/1992 | Faup et al. | |
| 5,275,728 | A | 1/1994 | Koller | |
| 5,290,451 | A | 3/1994 | Koster et al. | |
| 5,372,713 | A * | 12/1994 | Huber | 210/523 |
| 5,409,610 | A | 4/1995 | Clark | |
| 5,472,472 | A | 12/1995 | Northrop | |
| 5,531,898 | A | 7/1996 | Wickham | |
| 5,728,297 | A | 3/1998 | Koller | |
| 5,817,241 | A | 10/1998 | Brayboy | |
| 5,885,461 | A | 3/1999 | Tetrault et al. | |
| 5,910,243 | A * | 6/1999 | Bruke | 210/524 |
| 6,039,874 | A | 3/2000 | Teran et al. | |
| 6,077,548 | A | 6/2000 | Lasseur et al. | |
| 6,083,386 | A | 7/2000 | Lloyd | |
| 6,105,536 | A | 8/2000 | DeWaard | |
| 6,136,185 | A | 10/2000 | Sheaffer | |
| 6,190,566 | B1 | 2/2001 | Kolber | |
| 6,193,889 | B1 | 2/2001 | Teran et al. | |
| 6,231,631 | B1 | 5/2001 | Suzuki | |
| 6,245,121 | B1 | 6/2001 | Lamy et al. | |
| 6,346,240 | B1 | 2/2002 | Moore, Jr. | |
| 6,355,167 | B1 | 3/2002 | Wensauer | |
| 6,375,844 | B1 | 4/2002 | Ehrlich | |
| 6,387,267 | B1 | 5/2002 | Kantardjieff | |
| 6,398,959 | B1 | 6/2002 | Teran et al. | |
| 6,443,094 | B1 | 9/2002 | DeWaard | |
| 6,470,828 | B1 | 10/2002 | Townsend et al. | |
| 6,890,429 | B2 | 5/2005 | Herring, Sr. | |
| 6,908,554 | B2 | 6/2005 | Jackson | |
| 6,997,135 | B1 | 2/2006 | DeWaard | |
| 7,001,512 | B1 | 2/2006 | Newsome | |
| 7,005,068 | B2 | 2/2006 | Hoffland | |
| 7,067,065 | B2 * | 6/2006 | Schloss | 210/532.1 |
| 7,255,223 | B2 * | 8/2007 | Schaer et al. | 198/662 |
| 7,258,238 | B2 | 8/2007 | Raghupathy | |
| 7,306,731 | B1 | 12/2007 | DeWaard | |
| 7,631,595 | B1 | 12/2009 | DeWaard | |
| 7,987,778 | B1 | 8/2011 | DeWaard | |
| 8,142,667 | B2 | 3/2012 | DeWaard | |
| 8,201,495 | B2 | 6/2012 | DeWaard | |
| 2001/0013497 | A1 | 8/2001 | Kolber | |
| 2002/0020677 | A1 | 2/2002 | Noll | |
| 2002/0079266 | A1 | 6/2002 | Ainsworth et al. | |
| 2002/0084227 | A1 | 7/2002 | Sower | |
| 2003/0057160 | A1 | 3/2003 | Williams et al. | |
| 2004/0154988 | A1 | 8/2004 | Sheets, Sr. | |
| 2004/0159608 | A1 | 8/2004 | Hoffland | |
| 2006/0273048 | A1 | 12/2006 | Doyle et al. | |
| 2011/0100930 | A1 | 5/2011 | DeWaard | |
| 2011/0198268 | A1 | 8/2011 | DeWaard | |
| 2011/0253227 | A1 | 10/2011 | DeWaard | |
| 2011/0309039 | A1 | 12/2011 | DeWaard | |
| 2012/0000863 | A9 | 1/2012 | DeWaard | |
| 2012/0138515 | A1 | 6/2012 | DeWaard | |

FOREIGN PATENT DOCUMENTS

| | | | |
|---|---|---|---|
| CA | 2737609 | | 10/2011 |
| CA | 2764679 | | 7/2012 |
| DE | 40 42 167 | * | 7/1991 |

* cited by examiner

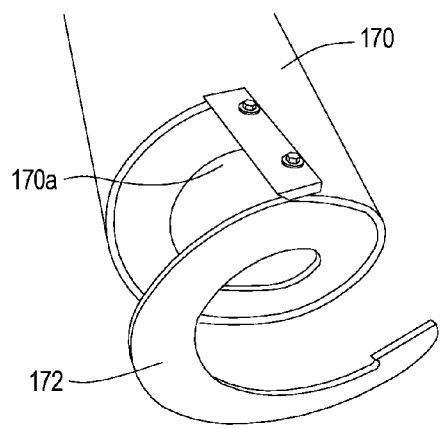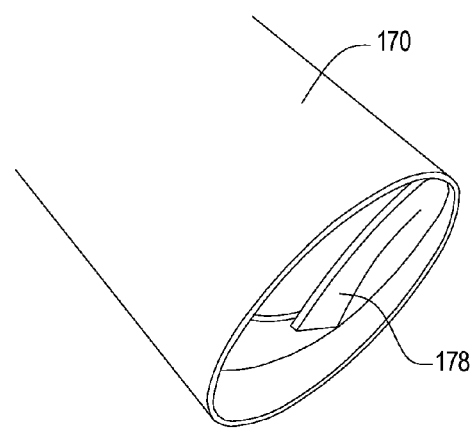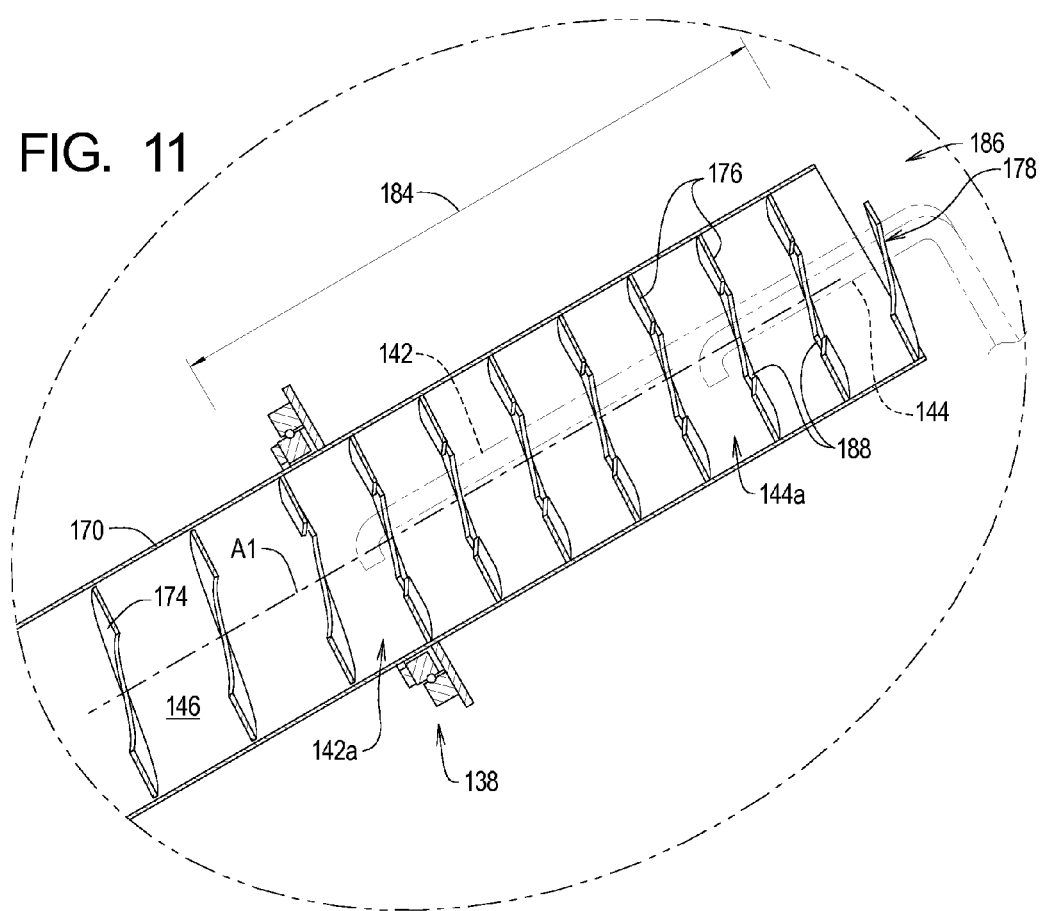

SYSTEMS AND METHODS FOR EXTRACTING SAND FROM RAW SLURRY MATERIAL

RELATED APPLICATIONS

This application, U.S. application Ser. No. 12/917,728 filed Nov. 2, 2010, claims priority to U.S. Provisional Application Ser. No. 61/258,467, filed Nov. 5, 2009.

The contents of any related application(s) listed above are incorporated herein be reference.

TECHNICAL FIELD

The present invention relates to the extraction of solid particulates from raw slurry material and, in particular, to the extraction of sand from raw slurry material comprising at least water, animal waste, and sand.

BACKGROUND

Modern animal husbandry operations such as dairy farms often require the handling of relatively large numbers of animals in indoor facilities. For example, cows in a dairy operation are kept at least part of the day in stalls defining a stall resting surface. From a cow's perspective, the stall resting surface should be covered with bedding material that is comfortable to lie on, provide uniform support, be cool in the summer, be non-abrasive, and provide confident footing during reclining and rising maneuvers. From the perspective of the operator of the dairy, bedding material should not be detrimental to the health of the cows or the quality of the milk produced by the cows. Sand has been proven to be advantageous as a bedding material and is commonly used in modern dairy operations.

When used as a bedding material, sand often becomes mixed with manure and possibly other contaminants. When cleaning systems are used to remove manure from a diary facility, raw slurry material is formed containing rinse liquids, liquid manure, solids, sand, and possibly other contaminants. If possible, it is desirable to convert components of the raw slurry mixture to usable materials and/or reuse the components of the raw slurry mixture.

The present invention relates to the removal of particulate material such as sand from raw slurry mixtures so that the sand may be reused. Removal of sand from the raw slurry material further forms a processed slurry (low sand content) that is more appropriate for further processing operations such as extraction of water, composting, and/or digesting.

SUMMARY

The present invention may be embodied as a processing system for processing raw slurry material comprising particulate material and liquid material to separate the particulate material from the liquid material. The processing system comprises a barrel member, at least one pre-processing member, and a plurality of separator members. The barrel member defines a processing axis A, a processing chamber defining a feed portion, a pre-processing portion, a separator portion, and an outlet opening. The at least one pre-processing member is supported by the barrel member within the feed portion and the pre-processing portion of the processing chamber. The plurality of separator members are supported by the barrel member within the separator portion of the processing chamber. The plurality of separator members define at least one separator gap. As the barrel member rotates about the processing axis A, the at least one pre-processing member transports at least a portion of the raw slurry material from the feed portion to the separator portion through the pre-processing portion such that at least some of the particulate material in the raw slurry material is transported to the separator portion and at least some of the liquid material in the raw slurry material is allowed to flow back towards the feed portion. The plurality of separator members transport at least a portion of the raw slurry material from the pre-processing portion to the outlet opening through the separator portion such that at least some of the particulate material in the raw slurry material is transported to the outlet opening and at least some of the liquid material in the raw slurry material is allowed to flow back towards the pre-processing portion through the at least one separator gap.

The present invention may also be embodied as a sand separator system for extracting sand from a raw slurry material comprising sand and liquid material. The sand separator member comprises a barrel member, a trough system, a support frame, a drive system, at least one pre-processing member, and a plurality of separator members. The barrel member defines a processing axis A, a processing chamber defining a feed portion, a pre-processing portion, a separator portion, and an outlet opening. The trough system contains a portion of the raw slurry material. The support frame supports the barrel member such that the feed portion is within the portion of the raw slurry material contained by the trough system. The drive system causes the barrel member to rotate about its axis. The at least one pre-processing member is supported by the barrel member within the feed portion and the pre-processing portion of the processing chamber. The plurality of separator members are supported by the barrel member within the separator portion of the processing chamber. The plurality of separator members define at least one separator gap. As the drive system causes the barrel member to rotate about the processing axis A, the at least one pre-processing member transports at least a portion of the raw slurry material from the feed portion to the separator portion through the pre-processing portion such that at least some of the sand in the raw slurry material is transported to the separator portion and at least some of the liquid material in the raw slurry material is allowed to flow back towards the feed portion. The plurality of separator members transport at least a portion of the raw slurry material from the pre-processing portion to the outlet opening through the separator portion such that at least some of the sand in the raw slurry material is transported to the outlet opening and at least some of the liquid material in the raw slurry material is allowed to flow back towards the pre-processing portion through the at least one separator gap.

The present invention may also be embodied as a method of processing raw slurry material comprising particulate material and liquid material to separate the particulate material from the liquid material comprising the following steps. A barrel member defining a processing axis A, a processing chamber defining a feed portion, a pre-processing portion, a separator portion, and an outlet opening is provided. At least one pre-processing member is supported within the feed portion and the pre-processing portion of the processing chamber. A plurality of separator members are supported within the separator portion of the processing chamber such that the plurality of separator members define at least one separator gap. The barrel member is rotated about the processing axis A1 such that the at least one pre-processing member transports at least a portion of the raw slurry material from the feed portion to the separator portion through the pre-processing portion such that at least some of the particulate material in the raw slurry material is transported to the separator portion, at least some of the liquid material in the raw slurry material is allowed to flow back towards the feed portion. In addition, the plurality of separator members transport at least a portion of the raw slurry material from the pre-processing portion to the outlet opening through the separator portion such that at least some of the particulate material in the raw slurry material is transported to the outlet opening and at least some of the liquid material in the raw slurry material is allowed to flow back towards the pre-processing portion through the at least one separator gap.

BRIEF DESCRIPTION OF THE DRAWINGS

FIG. 10 is a perspective view of a proximal end of a barrel member of the sand separator member illustrating a portion of the pre-processing member thereof;

FIG. 11 is an enlarged portion of FIG. 9;

FIG. 12 is a perspective view of a distal end of a barrel member of the sand separator member illustrating a portion of the separator members;

DETAILED DESCRIPTION

Figure 1:
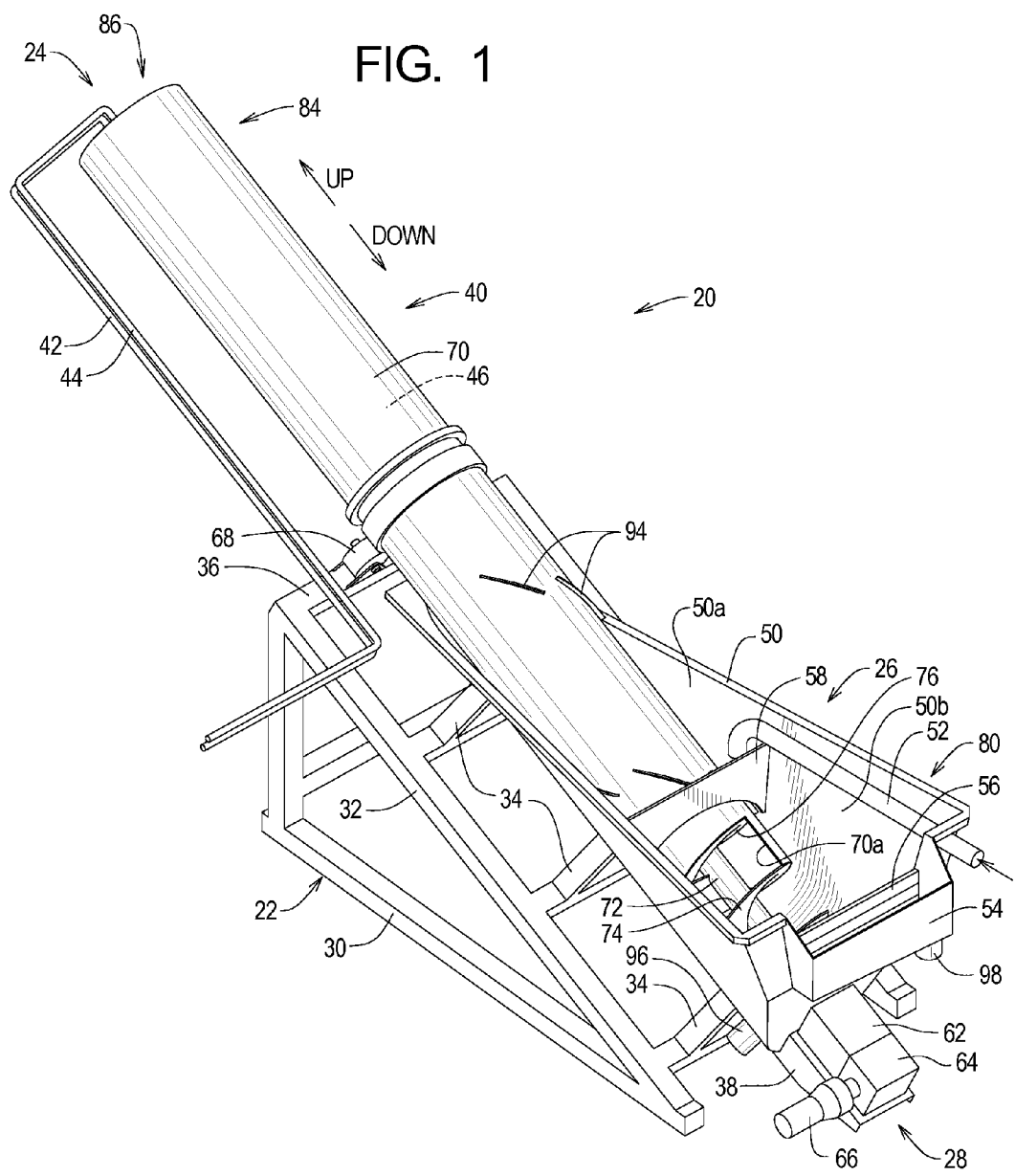
FIG. 1 is a perspective view of a first example sand separator system.

Referring initially to FIG. 1 of the drawing, depicted at 20 therein is a first example sand separator system constructed in accordance with, and embodying, the principles of the present invention. The first example sand separator system comprises a support frame 22, a processing system 24, a trough system 26, and a drive system 28.

In general, the support frame 22 supports the processing system relative to the trough system 26 such that slurry material within the trough system 26 is fed into the processing system 24. The drive system 28 rotates at least a portion of the processing system 24 such that particulate material such as sand is extracted from the slurry material fed into and through the processing system 24.

Figure 2:
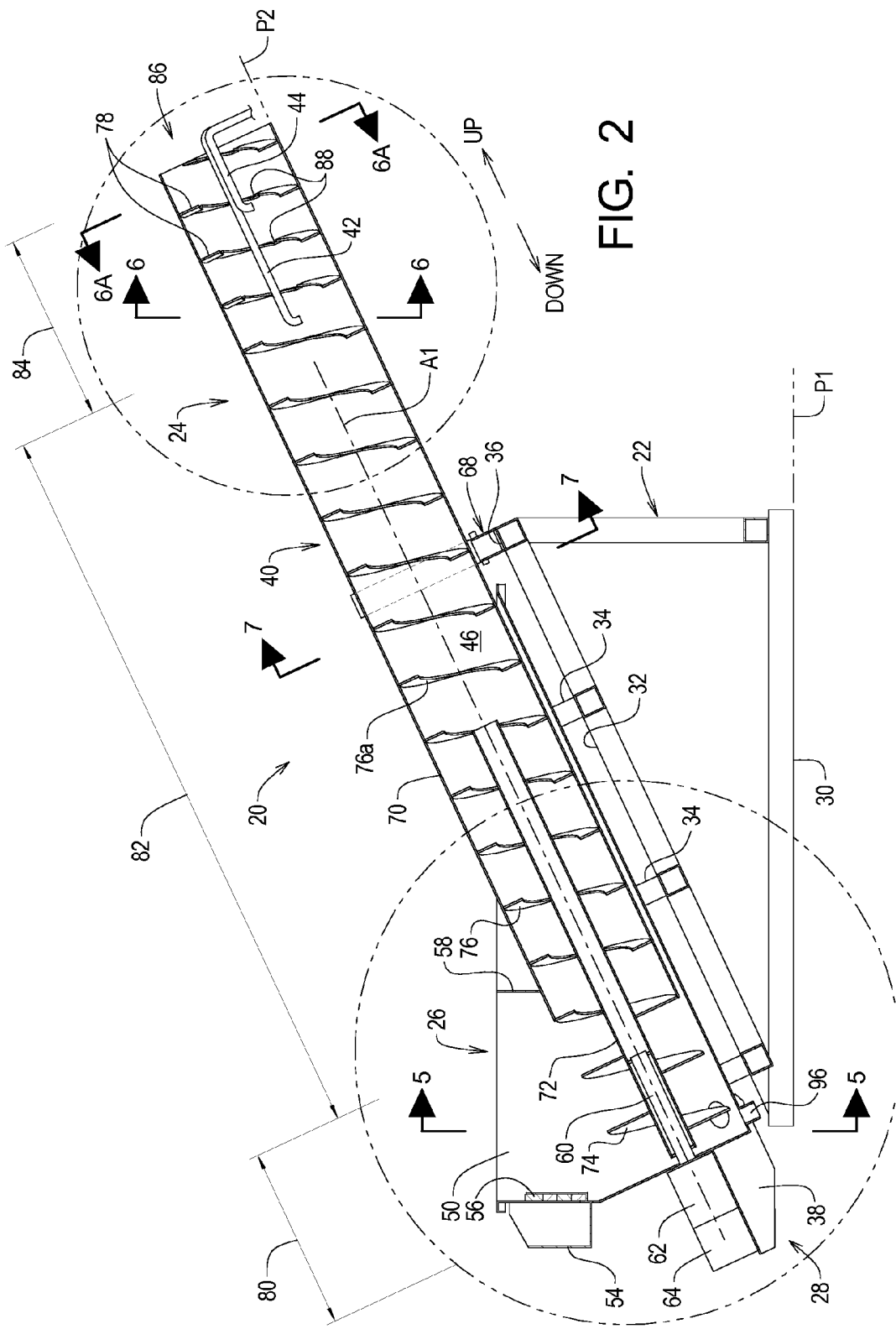
FIG. 2 is a side elevation view of the first example sand separator system.

The example support frame 22 defines a surface engaging portion 30, a support portion 32, cradle portions 34, a bearing surface 36, and a motor platform 38. The surface engaging portion 30 defines a reference plane P1, and the support portion 32 defines a support plane P2 that extends at an angle to the reference plane P1 (FIG. 2). The surface engaging portion 30 is adapted to be supported on a support surface such that the reference plane P1 is substantially horizontal. Accordingly, the reference plane P2 extends at an angle with respect to horizontal.

The purpose of the support frame 22 is to support the processing system 24 at a particular angle with respect to horizontal and in a desired position with respect to the trough system 26. Any structure that supports one or all of the processing, trough, and/or drive systems 24, 26, and 28 relative to horizontal and with respect to each other as generally described herein may be used in place of the example support frame 22.

FIG. 1 further shows that the example processing system 24 comprises a processing structure 40, a first processing conduit 42, and a second processing conduit 44. As perhaps best shown in FIG. 2, the processing structure 40 defines a processing axis A1 and a processing chamber 46. The example cradle portions 34 are configured to support trough system 26. The bearing surface 36 and motor platform 38 are arranged and configured such that the processing axis A1 is substantially parallel to the support plane P2 as will be described in further detail below. The processing axis A1 thus extends at an angle with respect to horizontal.

The example trough system 26 comprises a main trough 50, an inlet conduit 52, and an upper trough 54. A divider surface 56 separates the main trough 50 from the upper trough 54. A baffle 58 divides the main trough 50 into an inlet portion 50*a* and a feed portion 50*b*. The inlet conduit 52 is arranged deposit raw slurry material into the inlet portion 50*a*. Raw slurry material in the inlet portion 50*a* must flow down and under the baffle 58 before flowing into the feed portion 50*b*.

Figure 3:
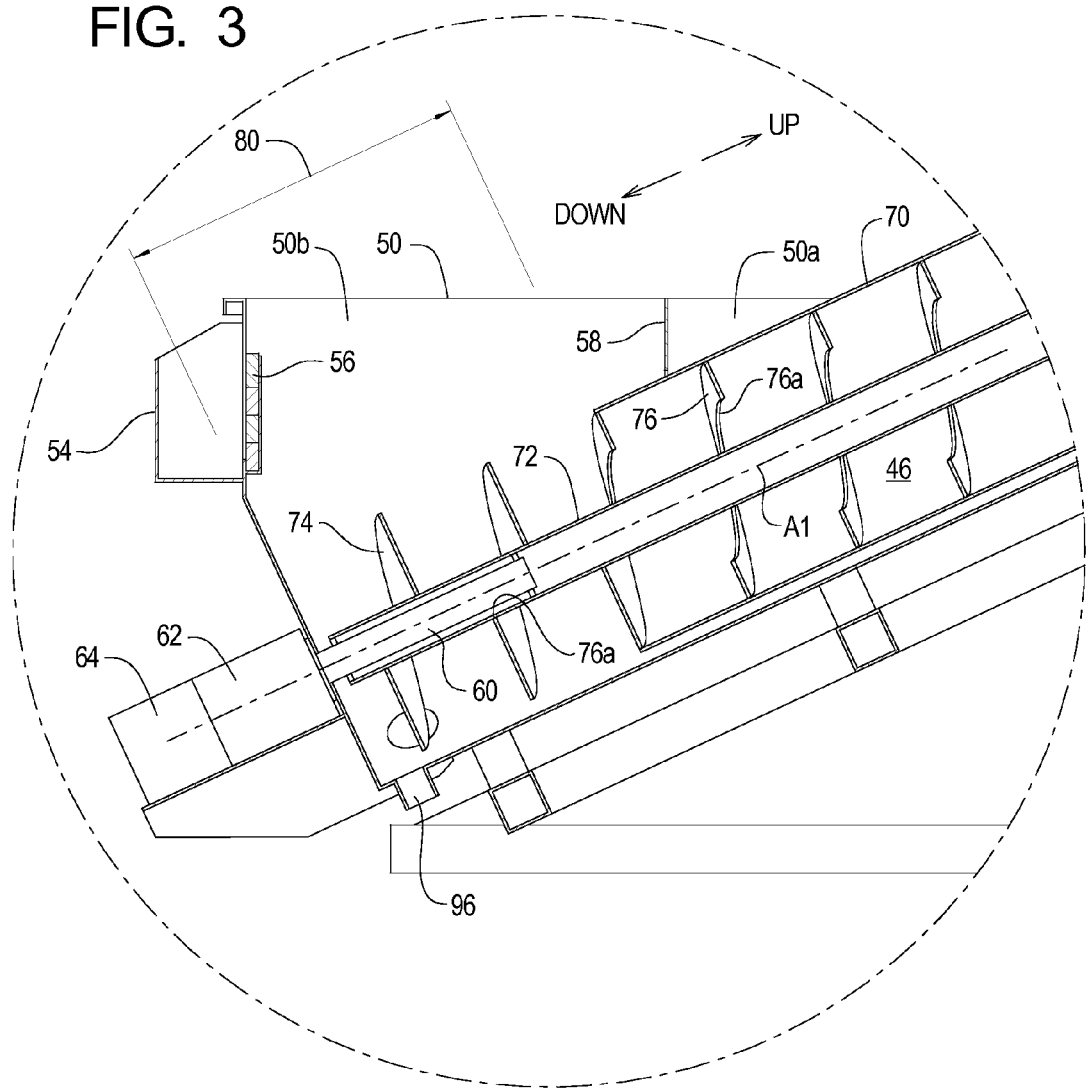
FIG. 3 is an enlarged portion of FIG. 2.
Figure 4:
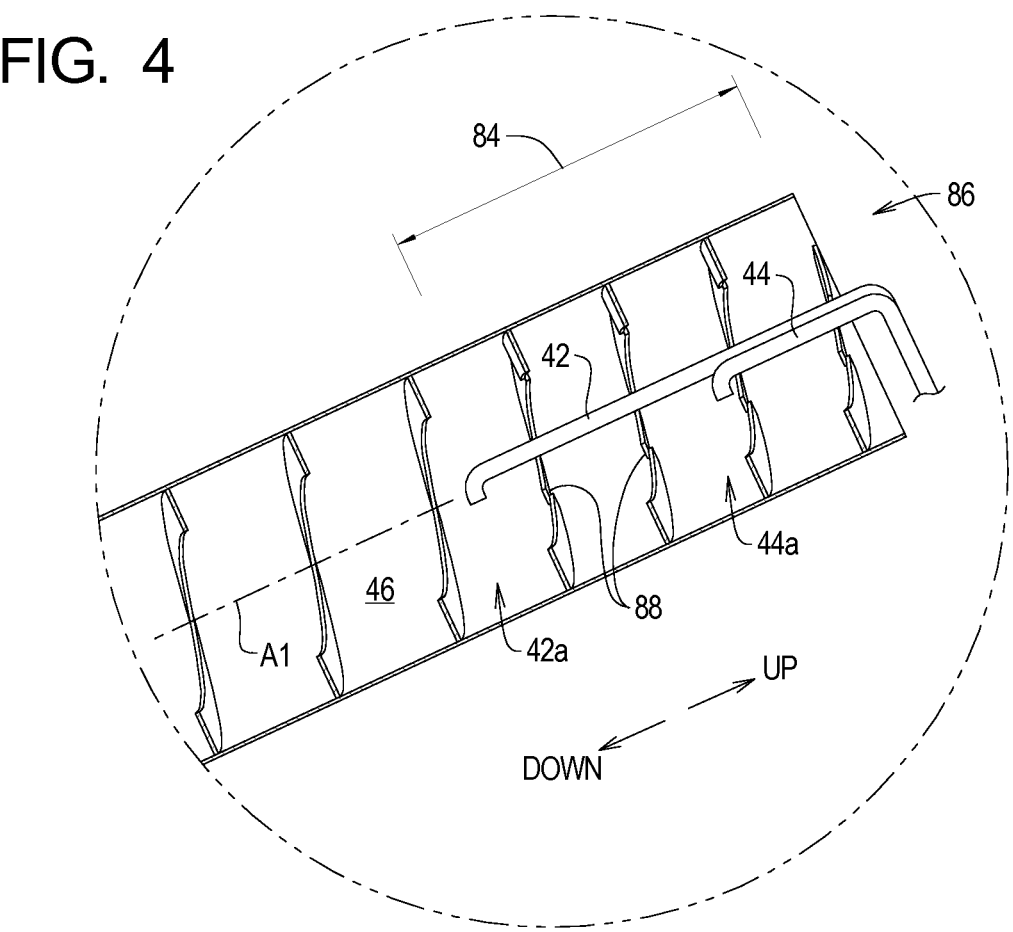
FIG. 4 is an enlarged portion of FIG. 2.
Figure 5:
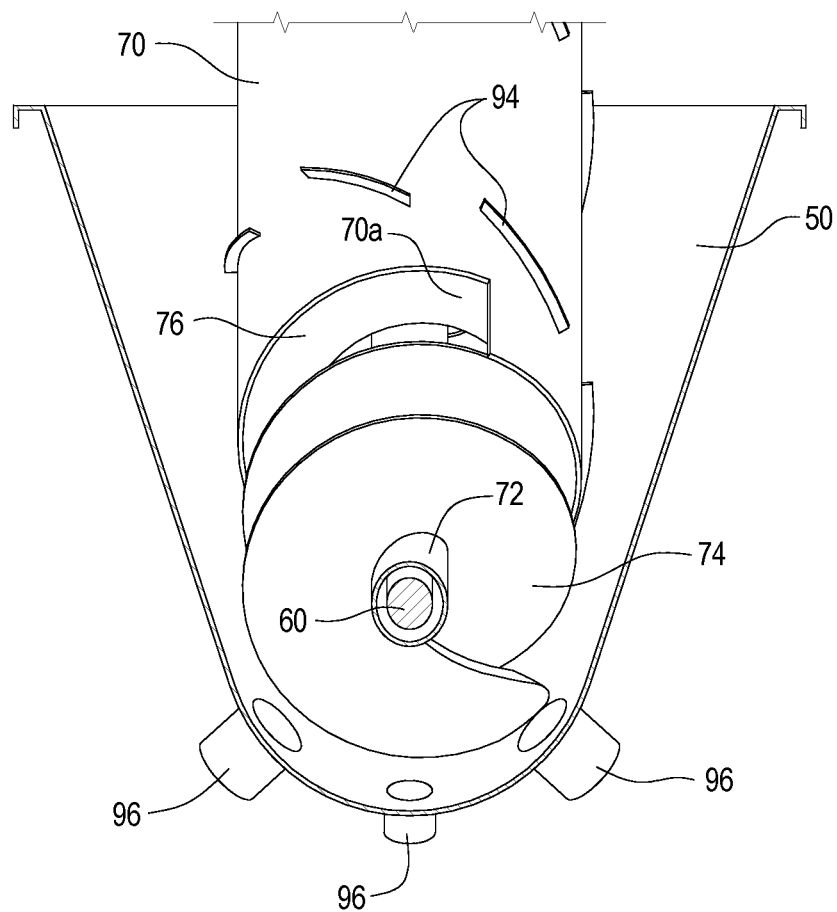
FIG. 5 is a partial cutaway, end elevation view of the first example sand separator system.
Figure 7:
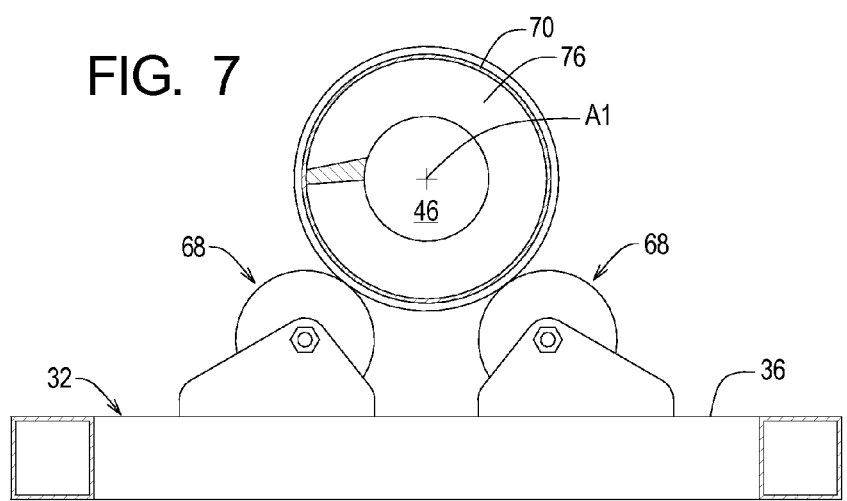
FIG. 7 is a cutaway view taken along lines 7-7 in FIG. 2.
Figure 8:
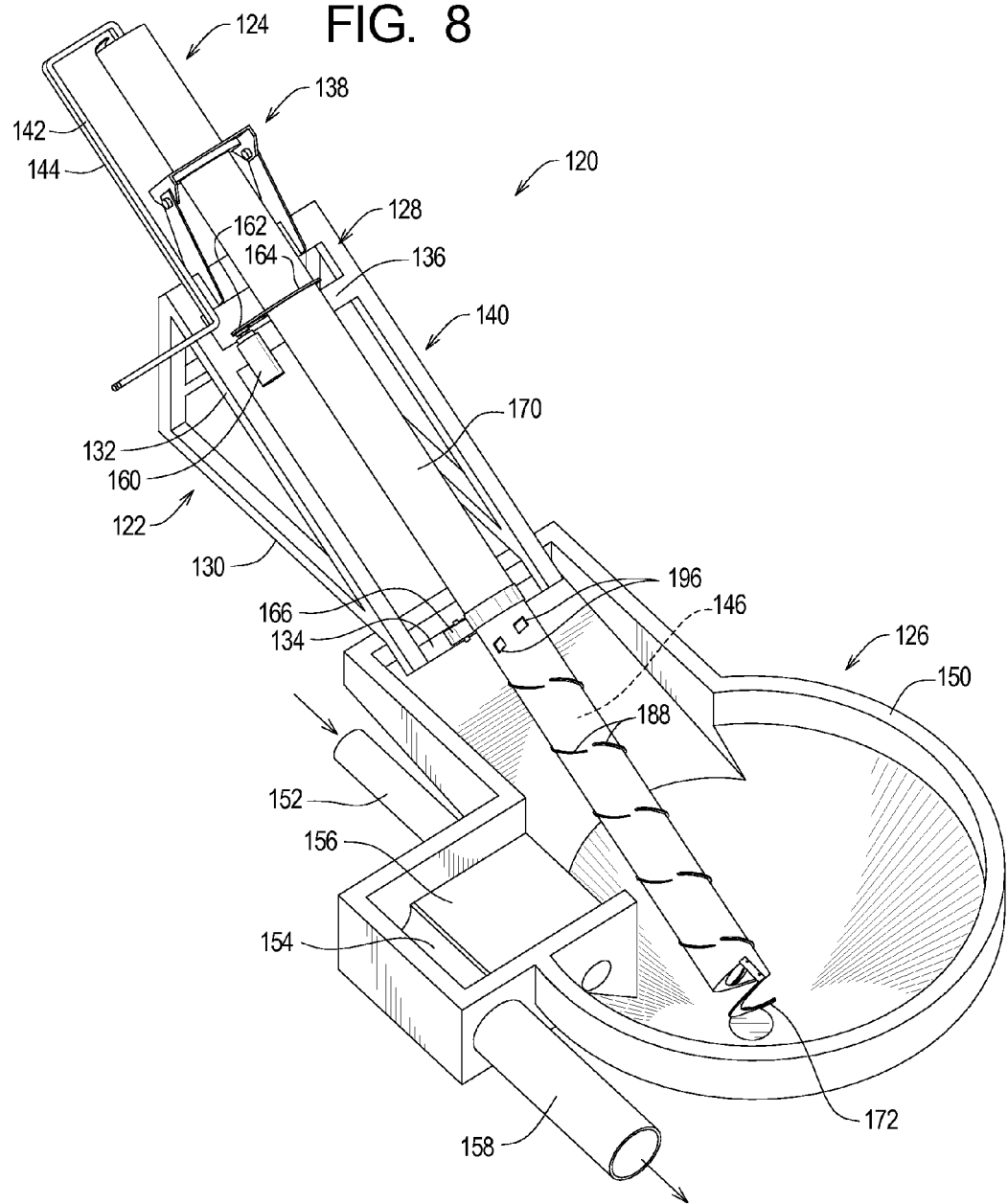
FIG. 8 is a perspective view of a second example sand separator system.
Figure 9:
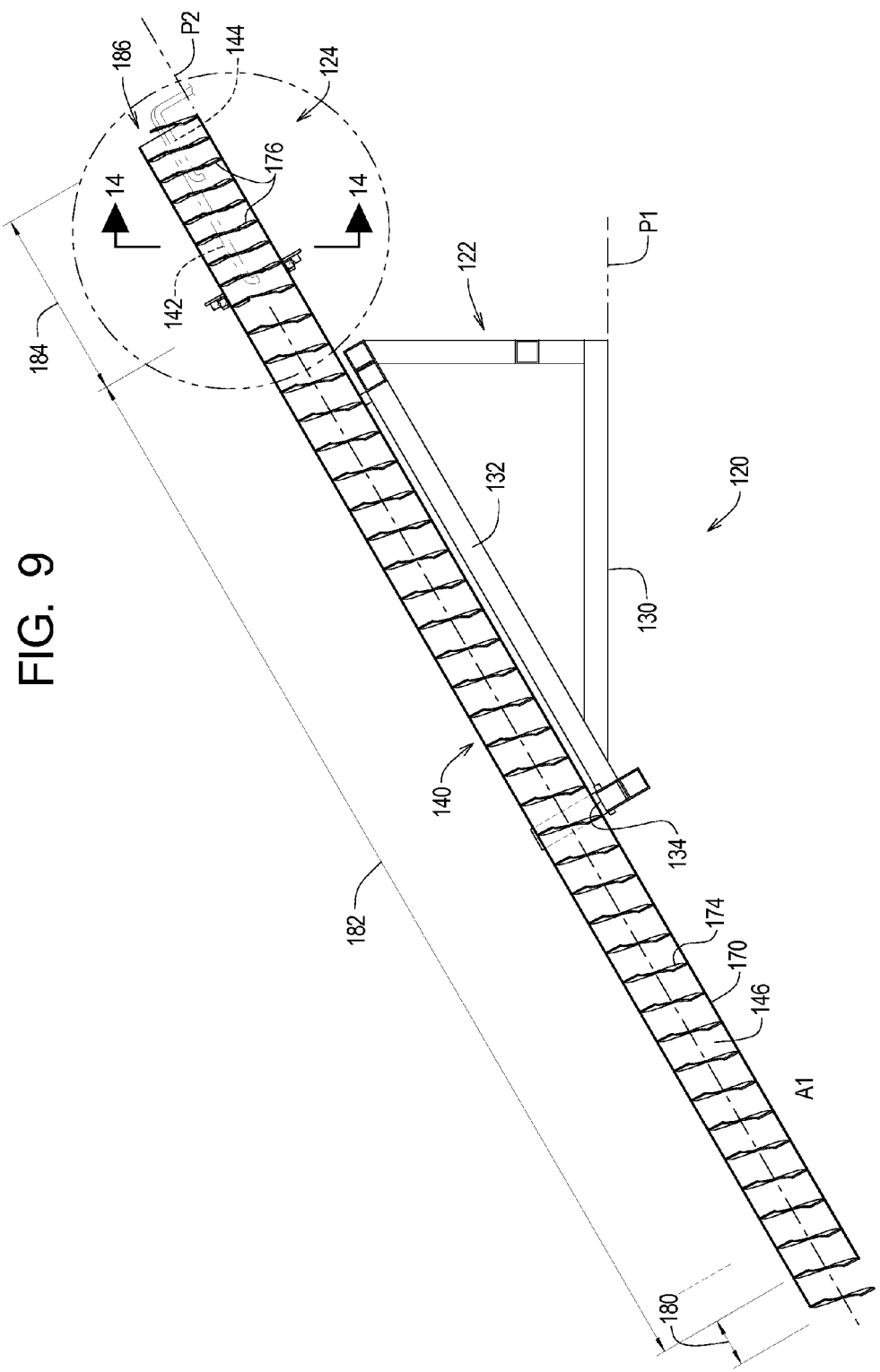
FIG. 9 is a side elevation view of the second example sand separator system.
Figure 13:
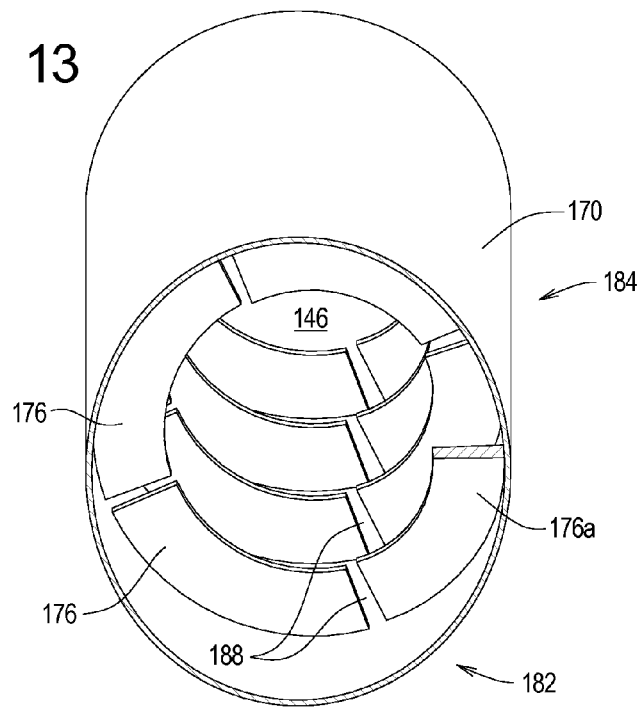
FIG. 13 is a perspective view of the distal end of a barrel member of the sand separator member illustrating portions of the separator members.
Figure 14:
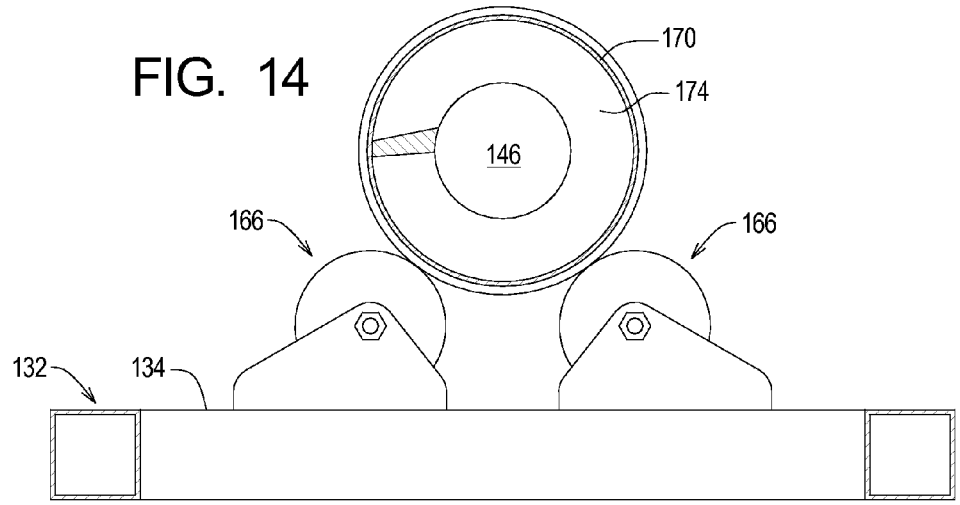
FIG. 14 is a cutaway view taken along lines 14-14 in FIG. 9.

The example drive system 28 comprises a drive shaft 60 (FIG. 3), a shaft bearing assembly 62, a transmission assembly 64, a drive motor assembly 66, and a plurality (two or more) bearing wheel assemblies 68 (FIG. 7). The drive motor assembly 66 rotates the drive shaft 60 through the transmission assembly 64. The example drive shaft 60 is connected to the processing structure 40 such that rotation of the drive shaft 60 causes rotation of the processing structure 40 about the processing axis A1. The shaft bearing assembly 62 is arranged to support the drive shaft 60 and thus an end of the processing structure 40. The bearing wheel assemblies 68 are configured to support a portion of the processing structure 40 for rotation about the processing axis A1.

The example processing structure 40 comprises a barrel member 70, a guide member 72, an auger member 74, a pre-processing member 76, and a plurality (two or more) separator members 78. The example barrel member 70 is an elongate cylinder made of material capable of maintaining this cylindrical shape while supporting the guide member 72, auger member 74, pre-processing member 76, and separator members 78 as will be described below. The example barrel member 70 is made of steel, but other materials such as plastic or composites may be used under certain circumstances.

The barrel member 70 defines both the processing chamber 46 and the processing axis A1. The processing chamber 46 defines a feed portion 80, a pre-processing portion 82, a separator portion 84, and an outlet portion 86.

The pre-processing member 76 and separator members 78 extend into the processing chamber 46 from the interior wall of the barrel member 70. In particular, the pre-processing member 76 extends substantially radially inwardly from the barrel member 70 into part of the feed portion 80 and throughout the pre-processing portion 82 of the processing chamber 46. The example pre-processing member 76 follows a predetermined helical path defined by the diameter of the barrel member 70 and the distance between axially spaced portions of the pre-processing member 76. In the following discussion, each portion or segment of the pre-processing member 76 extending through one rotation along the helical path defines a course. These discrete portions or sections of the pre-processing member 76 may thus be referred to as courses.

The guide member 72 is rigidly secured to an inner edge 76a of the portion of the pre-processing member 76 within the feed portion 80 such that a longitudinal axis of the guide member 72 is aligned with the processing axis A1. The auger member 74 is rigidly secured to the guide member 72 such that the auger member 74 extends from the guide member 72 outside of the processing chamber 46. The example auger member 74 further follows substantially the same predetermined helical path as the pre-processing member 76. A notch 70a is formed in the barrel member 70 to create a path from the feed portion 50b of the main trough 50 into the processing chamber 46 around the auger member 74 and through the pre-processing member 76.

The separator members 78 extend generally radially inwardly from the barrel member 70 and generally follow the predetermined helical path defined by the pre-processing member 76. However, the separator members 78 are spaced from each other along the predetermined helical path and/or deviate from the predetermined helical path such that separator gaps 88 are formed between adjacent separator members 78.

Figure 6:
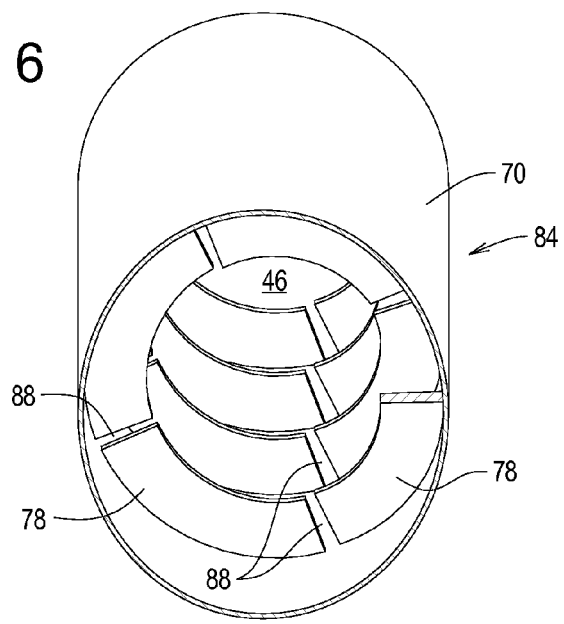
FIG. 6 is an end perspective view taken along lines 6-6 in FIG. 2.
Figure 6A:
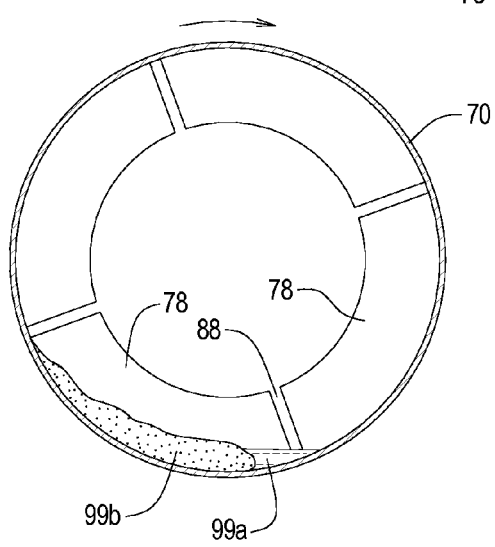
FIGS. 6A and 6B are section views taken along lines 6A-6A in FIG. 2 illustrating the separation of the raw slurry material into a thinned portion and a thickened portion.
Figure 6B:
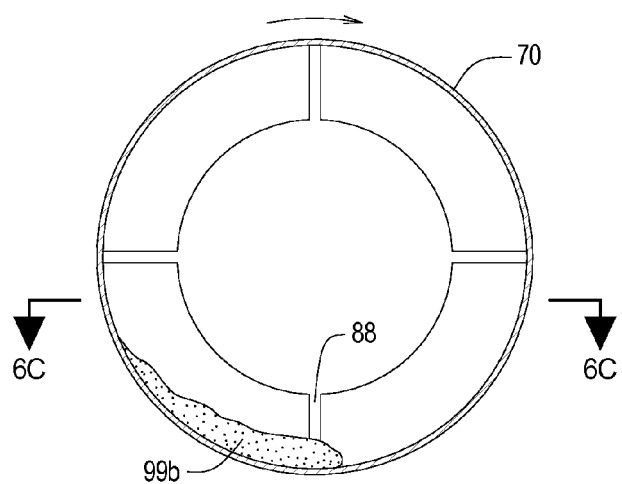
Figure 6C:
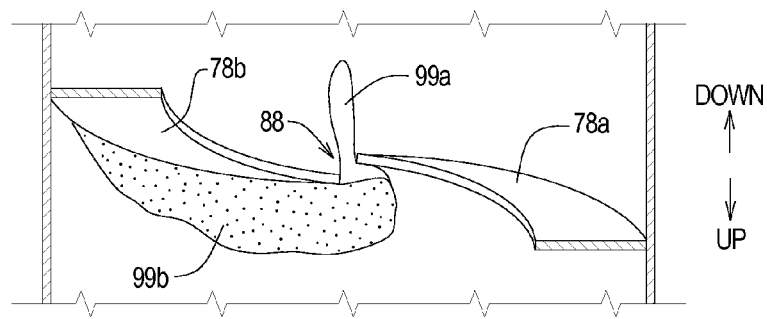
FIG. 6C is a section view taken along lines 6C-6C in FIG. 6B.
Figure 6D:
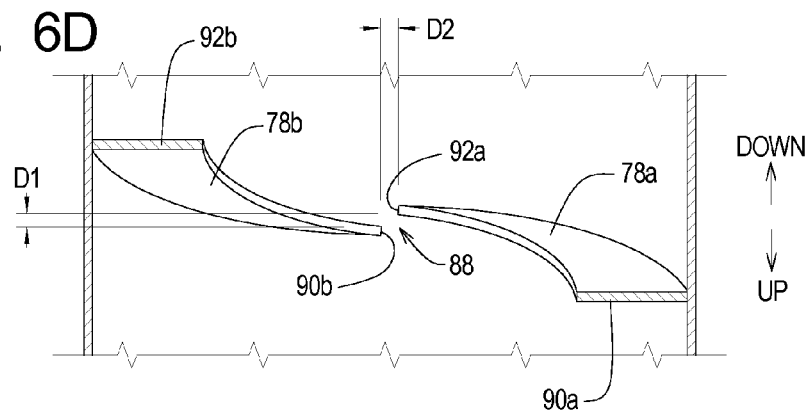
FIG. 6D is a section view similar to FIG. 6C without the raw slurry material.

In particular, first and second example separator members 78a and 78b are shown in FIG. 6D. As generally described above, the processing axis A1 extends at an angle with respect to horizontal; the processing axis A1 thus defines up and down directions as represented by arrows labeled UP and DOWN in drawing FIGS. 1-4, 6C, and 6D. In the context of any given pair of separator members, the uppermost separator member will be referred to as the as the leading separator member, while the lowermost separator member will be referred to as the trailing separator member. Using similar terminology, each separator member defines to radially aligned edges, and the uppermost of these edges will be referred to as the leading edge, while the lower most of these edges will be referred to as the trailing edge.

Accordingly, the first example separator member 78a is the leading separator member of this pair of separating members and defines a leading edge 90a and a trailing edge 92a. The second example separator member 78b is the trailing separator member in this pair and defines a leading edge 90b and a trailing edge 92b.

Using this terminology, FIG. 6D shows that the leading edge 90b of the trailing separator member 78b is above the trailing edge 92a of the leading separator member 78a by a distance D1. FIG. 6D also shows that the leading edge 90b of the trailing separator member 78b is circumferentially spaced from the trailing edge 92a of the leading separator member 78a by a distance D2. At least one of these distances D1 and D2 must be greater than zero to define the separator gap 88.

The example separator members 78 are in the shape of segments of the predetermined helical path but each helical separator member is offset from the predetermined helical path relative to the helical separators adjacent thereto. Another way of forming the separator gaps 88 is to arrange non-helical separator members along the predetermined helical path. Additionally, non-helical separator members may be offset from the predetermined helical path to form the separator gaps 88.

The example processing structure 40 further comprises cleaning blades 94 formed on the outer surface thereof. Main trough outlets 96 are formed in the main trough 50, while upper trough outlets 98 are formed in the upper trough 54.

The first example sand separator system 20 operates as follows. Raw slurry material is forced through the inlet conduit 52 into the inlet portion 50a of the main trough 50. The example sand separator system 20 is designed to process raw slurry material a liquid portion comprising at least rinse liquid, such as water, and manure and a particulate portion comprising particulate material such as sand.

The baffle 58 forces the raw slurry material to flow down to the bottom of the main trough 50 before entering the feed portion 50b of that trough 50. The main trough 50 thus functions like a gravity separator in which heavier particulate material such as sand sinks to the bottom and the liquid portion rises to the top. The flow path under the baffle 58 forces particulate material to flow to a lower portion of the trough 50 before entering the upper trough 54 as will be described in further detail below.

The support frame 22 supports the processing structure 40 such that the feed portion 80 of the processing chamber 46 is within the feed portion 50b of the main trough 50. The auger member 74 extends into the bottom of the main trough 50 with the drive shaft 60 partly within the guide member 72. In particular, the drive shaft 60 is coupled to the guide member 72 such that axial rotation of the drive shaft 60 rotates the guide member 72 about the processing axis A1. And because the guide member 72 supports the auger member 74 and pre-processing member 76, the auger member 74 and pre-processing member 76 also rotate about the processing axis A1. Similarly, the pre-processing member 76 supports the barrel member 70, so the barrel member 70 also rotates about the processing axis A1. And axial rotation of the barrel member 70 causes the separator members 78 also to rotate about the processing axis A1.

As the auger member 74 rotates about the processing axis A1, a leading surface of the auger member 74 acts on the raw slurry material within the main trough 50 to displace this raw slurry material up towards the processing chamber 46. At about the notch 70a formed in the barrel member 70, the raw slurry material displaced by the auger member 74 enters the pre-processing portion 82 of the processing chamber, where the raw slurry material is displaced through the pre-processing portion 82 by a leading surface of the pre-processing member 76.

As the pre-processing member displaces the raw slurry material up along the processing axis A1 through the pre-processing portion of the processing chamber, the particulate portion of the raw slurry material sinks in the liquid portion of the raw slurry material, separating the raw slurry material into thickened portion and a thinned portion. The thickened portion is relatively close to the inner wall of the barrel member 70, while the thinned portion is away from this inner wall. The thickened portion has a relatively high concentration of particulate material, while the thinned portion has a relatively lower concentration of the particulate material. The concentration of particulate material in the thickened portion increases as the raw slurry material proceeds up through the pre-processing portion 82 of the processing chamber 46.

Towards the lower end of the pre-processing portion 82 of the processing chamber 46, the thinned portion of the raw slurry material flows over the inner edge 76a of the pre-processing member 76 from one course of the pre-processing member 76 back down to the course below. This process begins to concentrate the particulate material within the thickened portion. At some point along the pre-processing portion 82, the thinned portion of the raw slurry material no longer flows over the inner edge 76a.

After this point, the slurry material continues to separate, with the lighter, leading portion thereof being pushed in front (i.e., in the direction opposite the direction of rotation of the barrel member) and the heavier lagging portion behind (i.e., in the direction of rotation of the barrel member).

Accordingly, by the time the raw slurry material reaches the separator portion 84, the slurry material has been thickened and separated into a leading portion and a lagging portion. The leading portion will contain a lower concentration of particulate, while the lagging portion will contain a higher concentration of particulate.

FIGS. 6A, 6B, and 6C illustrate what happens as the slurry passes through the separator portion 84 of the processing chamber 46. FIGS. 6A and 6C show the leading portion 99a of the slurry material, while FIGS. 6A, 6B, and 6C show both the leading portion 99a and the lagging portion 99b. As generally described above, rotation of the barrel member 70 causes the leading portion 99a to cross the separator gaps 88. The more fluid leading portion 99a passes through the gaps 88 to the course below. The less fluid lagging portion 99b, however, projects across the separator gap onto the next separator member 78. Accordingly, as the slurry material moves across the successive separator gaps 88 formed by the separator members 78 in the separator region, more and more of the more fluid portion flows back down through the processing chamber. The processing system 24 thus separates the particulate portion of the raw slurry material from the liquid portion of the raw slurry material.

The portion of the material raw slurry material that reaches the outlet portion 86 of the separator chamber comprises a very high proportion of the particulate portion in comparison to the proportion of the particulate material in the raw slurry material entering the feed portion 80.

In addition to separating the particulate portion from the liquid portion of the raw slurry material, the first example sand separating system 20 may be configured to clean the particulate portion and/or dilute the liquid portion. In particular, one or both of the first and second example processing conduits of the first example processing system 24 may be to configured to arrange rinse liquids within the processing chamber 46.

In the example processing system 24, the first processing conduit 42 is arranged to deposit a first rinse fluid at a first location 42a within the processing chamber 46. The second processing conduit 44 is arranged to deposit a second rinse fluid at a second location 44a within the processing chamber 46. The processing system 24 may thus be operated without a supplemental rinse fluid, with either the first rinse fluid or the second rinse fluid, or with both the first and second rinse fluids.

Typically, the first location 42a at which the first rinse fluid is introduced is below the second location 44a at which the second rinse fluid. In the example processing system 24, the first location 42a is between the second location 44a and the feed portion 80, approximately at the junction of the pre-processing portion 82 and the separator portion 84. The second location is between the first location 42a and the outlet portion 86 of the processing chamber 46.

In this configuration, the second rinse fluid may be a relatively pure or clean liquid such as water while the first rinse fluid may be a relatively impure fluid that is a byproduct of the stall rinse system. The first rinse fluid will provide a fresh volume of low contaminant liquid material to facilitate separation of the particulate portion from the liquid portion of the raw slurry material. The second rinse fluid will provide a fresh volume of uncontaminated liquid material to rinse contaminants from the particulate portion of the raw slurry material. Additives such as lubricants, defoamers, disinfectants, or the like may be added to one or both of the first and second rinse fluids.

The liquid portion of the raw slurry material flows back down through the processing chamber 46 and collects in the feed portion 50b of the main trough 50. This liquid portion will collect in the upper portion of the main trough 50 and will eventually flow over the divider surface 56, into upper trough 54, and out of the system 20 through the upper trough outlets 98. The main trough outlets 96 allow material to be removed from the bottom of the main trough 50 when necessary.

Referring now to FIGS. 9-14 of the drawing, depicted at 120 therein is a second example sand separator system constructed in accordance with, and embodying, the principles of the present invention. The second example sand separator system comprises a support frame 122, a processing system 124, a trough system 126, and a drive system 128.

In general, the support frame 122 supports the processing system relative to the trough system 126 such that slurry material within the trough system 126 is fed into the processing system 124. The drive system 128 rotates at least a portion of the processing system 124 such that particulate material such as sand is extracted from the slurry material fed into and through the processing system 124.

The example support frame 122 defines a surface engaging portion 130, a support portion 132, a bearing surface 134, a motor platform 136, and brace assembly 138. The surface engaging portion 130 defines a reference plane P1, and the support portion 132 defines a support plane P2 that extends at an angle to the reference plane P1 (FIG. 12). The surface engaging portion 130 is adapted to be supported on a support surface such that the reference plane P1 is substantially horizontal. Accordingly, the reference plane P2 extends at an angle with respect to horizontal.

The purpose of the support frame 122 is to support the processing system 124 at a particular angle with respect to horizontal and in a desired position with respect to the trough system 126.

FIG. 1 further shows that the example processing system 124 comprises a processing structure 140, a first processing conduit 142, and a second processing conduit 144. As perhaps best shown in FIG. 12, the processing structure 140 defines a processing axis A1 and a processing chamber 146. The bearing surface 134 and motor platform 136 are to arranged and configured such that the processing axis A1 is substantially parallel to the support plane P2 as will be described in further detail below. The processing axis A1 thus extends at an angle with respect to horizontal.

The example trough system 126 comprises a main trough 150, an inlet conduit 152, and an upper trough 154. A divider surface 156 separates the main trough 150 from the upper trough 154. The inlet conduit 152 is arranged deposit raw slurry material into the main trough 150. An outlet conduit 158 allows fluid to flow out of the upper trough 154.

The example drive system 128 comprises a drive motor 160, a drive member 162 such as a belt or chain, a drive surface 164 such as a sprocket, and bearing wheel assemblies 166. The drive motor 160 causes rotation of the processing structure 140 through the drive member 162 and the drive surface 164. The bearing wheel assemblies 166 support the processing structure 140 for rotation about the processing axis A1.

The example processing structure 140 comprises a barrel member 170, a pre-processing member 172, a plurality (two or more) separator members 174, an inlet member 176, and an extension portion 178. The example barrel member 170 is an elongate cylinder made of material capable of maintaining this cylindrical shape while supporting the pre-processing member 172 and separator members 174 as will be described below. The example barrel member 170 is made of steel, but other materials such as plastic or composites may be used under certain circumstances.

The barrel member 170 defines both the processing chamber 146 and the processing axis A1. The processing chamber 146 defines a feed portion 180, a pre-processing portion 182, a separator portion 184, and an outlet portion 186. Part of the pre-processing member 172 extends out of the processing chamber 146 and to define the feed portion of the processing chamber 146. The inlet member 176 is arranged adjacent to the feed portion of the processing chamber 146 and defines an inlet surface that facilitates the entry of the raw slurry material into the processing chamber 146. Part of the last separator member 174 extends out through the outlet opening 186 such that particulate material does not drop back into the separator portion 184 of the processing chamber 146.

The pre-processing member 172 and separator members 174 extend into the processing chamber 146 from the interior wall of the barrel member 170. In particular, the pre-processing member 172 extends substantially radially inwardly from the barrel member 170 into part of the feed portion 180 and throughout the pre-processing portion 182 of the processing chamber 146. The example pre-processing member 172 follows a predetermined helical path defined by the diameter of the barrel member 170 and the distance between axially spaced portions of the pre-processing member 172. In the following discussion, each portion or segment of the pre-processing member 172 extending through one rotation along the helical path defines a course. These discrete portions or sections of the pre-processing member 172 may thus be referred to as courses.

The separator members 174 extend generally radially inwardly from the barrel member 170 and generally follow the predetermined helical path defined by the pre-processing member 172. However, the separator members 174 are spaced from each other along the predetermined helical path and/or deviate from the predetermined helical path such that separator gaps 188 are formed between adjacent separator members 174.

The example processing structure 140 further comprises cleaning blades formed on the outer surface thereof. The upper trough conduit 158 allows fluid to flow out of the upper trough 154.

The second example sand separator system 120 operates in a manner that is generally similar to that of the first example sand separator 20 described above. Raw slurry material is forced through the inlet conduit 152 into the main trough 150. The example sand separator system 120 is designed to process raw slurry material a liquid portion comprising at least rinse liquid, such as water, and manure and a particulate portion comprising particulate material such as sand. The main trough 150 functions like a gravity separator in which heavier particulate material such as sand sinks to the bottom and the liquid portion rises to the top.

The support frame 122 supports the processing structure 140 such that the feed portion 180 of the processing chamber 146 is within the main trough 150. Rotation of the barrel member 170 causes the particulate portion of the raw slurry material to move up through the processing chamber 146 and out of the outlet portion 186. As generally described above, the portion of the material raw slurry material that reaches the outlet portion 186 of the separator chamber comprises a very high proportion of the particulate portion in comparison to the proportion of the particulate material in the raw slurry material entering the feed portion 180.

In addition to separating the particulate portion from the liquid portion of the raw slurry material, the second example sand separating system 120 may be configured to clean the particulate portion and/or dilute the liquid portion. In particular, one or both of the first and second example processing conduits of the second example processing system 124 may be configured to arrange rinse liquids within the processing chamber 146.

In the example processing system 124, the first processing conduit 142 is arranged to deposit a first rinse fluid at a first location 142a within the processing chamber 146. The second processing conduit 144 is arranged to deposit a second rinse fluid at a second location 144a within the processing chamber 146. The processing system 124 may thus be operated without a supplemental rinse fluid, with either the first rinse fluid or the second rinse fluid, or with both the first and second rinse fluids.

Typically, the first location 142a at which the first rinse fluid is introduced is below the second location 144a at which the second rinse fluid. In the example processing system 124, the first location 142a is between the second location 144a and the feed portion 180, approximately at the junction of the pre-processing portion 182 and the separator portion 184. The second location is between the first location 142a and the outlet portion 186 of the processing chamber 146.

In this configuration, the second rinse fluid may be a relatively pure or clean liquid such as water while the first rinse fluid may be a relatively impure fluid that is a byproduct of the stall rinse system. The first rinse fluid will provide a fresh volume of low contaminant liquid material to facilitate separation of the particulate portion from the liquid portion of the raw slurry material. The second rinse fluid will provide a fresh volume of uncontaminated liquid material to rinse contaminants from the particulate portion of the raw slurry material. Additives such as lubricants, defoamers, disinfectants, or the like may be added to one or both of the first and second rinse fluids.

The liquid portion of the raw slurry material flows back down through the processing chamber 146 and collects in the main trough 150. This liquid portion will collect in the upper portion of the main trough 150 and will eventually flow over the divider surface 156, into upper trough 154, and out of the system 120 through the upper trough outlet 158.

Figure 15:
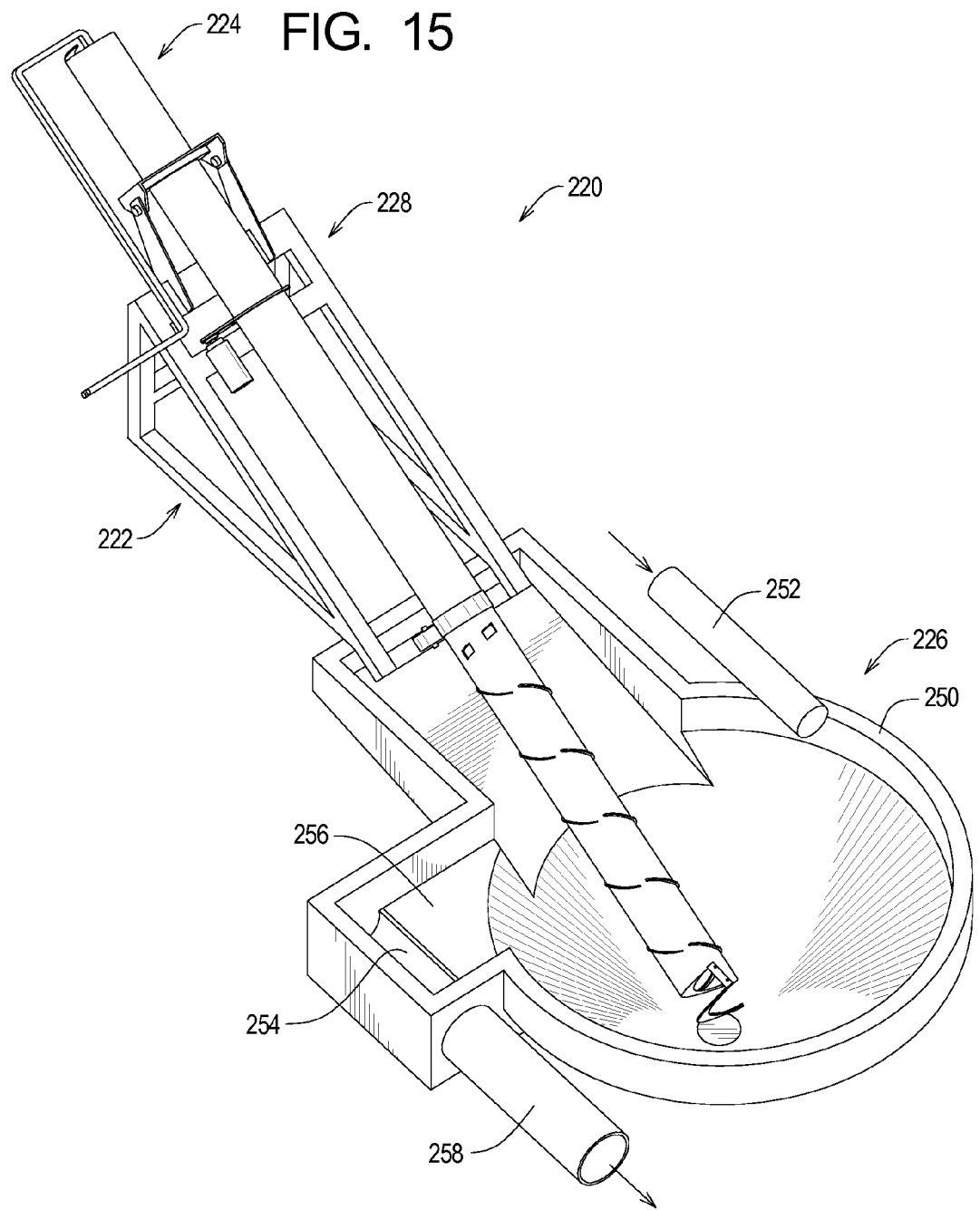
FIG. 15 is a perspective view of a third example sand separator system.

Referring now to FIG. 15 of the drawing, depicted at 220 therein is a second example sand separator system constructed in accordance with, and embodying, the principles of the present invention. The second example sand separator system comprises a support frame 222, a processing system 224, a trough system 226, and a drive system 228. The processing system 224 and drive system 228 are or may be the same as the processing system 124 and drive system 128 described above and will not be described herein in detail.

The example trough system 226 comprises a main trough 250, an inlet conduit 252, and an upper trough 254. A divider surface 256 separates the main trough 250 from the upper trough 254. The inlet conduit 252 is arranged deposit raw slurry material into the main trough 250. An outlet conduit 258 allows fluid to flow out of the upper trough 254. In the example trough system 226, the inlet conduit 252 is arranged such that the main trough 250 is gravity fed. Raw slurry material entering the main trough flows down and around a conical surface defined by the main trough 250 so that the particulate material has time to sink to the bottom of the main trough 250 and be taken in by the processing system 224.

What is claimed is:

1. A processing system for processing raw slurry material comprising particulate material and liquid material to separate the particulate material from the liquid material, the processing system comprising:
   a barrel member defining a processing axis A, a processing chamber defining a feed portion, a pre-processing portion, a separator portion, and an outlet opening;
   at least one pre-processing member, where the at least one pre-processing member is supported by the barrel member within the feed portion and the pre-processing portion of the processing chamber; and
   a plurality of separator members, where
      the plurality of separator members are supported by the barrel member within the separator portion of the processing chamber, and
      the plurality of separator members define at least one separator gap; and
   a drive system for causing the barrel member to rotate about its axis; wherein as the drive system rotates the barrel member about the processing axis A,
      the at least one pre-processing member transports at least a portion of the raw slurry material from the feed portion to the separator portion through the pre-processing portion such that
         at least some of the particulate material in the raw slurry material is transported to the separator portion, and
         at least some of the liquid material in the raw slurry material is allowed to flow back towards the feed portion, and
      the plurality of separator members transport at least a portion of the raw slurry material from the pre-processing portion to the outlet opening through the separator portion such that
         at least some of the particulate material in the raw slurry material is transported to the outlet opening, and
         at least some of the liquid material in the raw slurry material is allowed to flow back towards the pre-processing portion through the at least one separator gap.

2. A processing system as recited in claim 1, further comprising at least one processing conduit arranged to introduce rinse fluid into the processing chamber.

3. A processing system as recited in claim 1, further comprising:
   a first processing conduit arranged to introduce a first rinse fluid into the processing chamber at a first location; and
   a second processing conduit arranged to introduce a second rinse fluid into the processing chamber at a second location.

4. A processing system as recited in claim 3, in which the first rinse fluid is recovered liquid and the second rinse fluid is fresh water.

5. A processing system as recited in claim 4, in which the first location is arranged between the feed portion and the second location.

6. A processing system as recited in claim 5, in which:
   the first location is at the juncture of the pre-processing portion and the separator portion; and
   the second location is within the separator portion.

7. A processing system as recited in claim 1, in which the pre-processing member comprises a continuous helical member extending inwardly from an interior wall of the barrel member.

8. A processing system as recited in claim 1, in which each of the plurality of separator members is a helical member extending inwardly from an interior wall of the barrel member.

9. A processing system as recited in claim 8, in which each of the helical members are offset from each other to define the separator gaps.

10. A processing system as recited in claim 8, in which each pair of adjacent helical members are arranged along separate helical paths to define the separator gaps.

11. A processing system as recited in claim 1, in which:
    the pre-processing member comprises a continuous helical member extending inwardly from an interior wall of the barrel member; and
    each of the plurality of separator members is a helical segment extending inwardly from an interior wall of the barrel member.

12. A processing system as recited in claim 11, in which the helical member and the helical segments extend radially inwardly towards the processing axis A.

13. A processing system as recited in claim 1, in which a leading edge of a first separator member is spaced from a trailing edge of a second separator member adjacent to the first separator member.

14. A processing system as recited in claim 1, further comprising:
    a guide member, where a first portion of the guide member is supported by the within the feed portion of processing chamber and a second portion of the guide member is supported outside of the processing chamber adjacent to the feed portion of the processing chamber; and
    at least one auger member, where the guide member supports the auger member adjacent to the feed portion of the processing chamber; wherein
    as the barrel member rotates about the processing axis A, the at least one auger member transports at least a portion of the raw slurry material into the processing chamber through the feed portion such that
       at least some of the raw slurry material is transported to the separator portion, and
       at least some of the liquid material in the raw slurry material is allowed to flow back out of the processing chamber through the feed portion.

15. A sand separator system for extracting sand from a raw slurry material comprising sand and liquid material comprising:
    a barrel member defining a processing axis A, a processing chamber defining a feed portion, a pre-processing portion, a separator portion, and an outlet opening;
    a trough system for containing a portion of the raw slurry material;
    a support frame for supporting the barrel member such that the feed portion is within the portion of the raw slurry material contained by the trough system;
    a drive system for causing the barrel member to rotate about its axis;
    at least one pre-processing member, where the at least one pre-processing member is supported by the barrel member within the feed portion and the pre-processing portion of the processing chamber; and
    a plurality of separator members, where
       the plurality of separator members are supported by the barrel member within the separator portion of the processing chamber, and
       the plurality of separator members define at least one separator gap; wherein as the drive system causes the barrel member to rotate about the processing axis A, the at least one pre-processing member transports at least a portion of the raw slurry material from the feed portion to the separator portion through the pre-processing portion such that at least some of the sand in the raw slurry material is transported to the separator portion, and at least some of the liquid material in the raw slurry material is allowed to flow back towards the feed portion, and the plurality of separator members transport at least a portion of the raw slurry material from the pre-processing portion to the outlet opening through the separator portion such that at least some of the sand in the raw slurry material is transported to the outlet opening, and at least some of the liquid material in the raw slurry material is allowed to flow back towards the pre-processing portion through the at least one separator gap.

16. A sand separator system as recited in claim 15, further comprising at least one processing conduit arranged to introduce rinse fluid into the processing chamber.

17. A sand separator system as recited in claim 15, further comprising:

a first processing conduit arranged to introduce a first rinse fluid into the processing chamber at a first location; and a second processing conduit arranged to introduce a second rinse fluid into the processing chamber at a second location.

18. A sand separator system as recited in claim 17, in which the first rinse fluid is recovered liquid and the second rinse fluid is fresh water.

19. A sand separator system as recited in claim 18, in which the first location is arranged between the feed portion and the second location.

20. A sand separator system as recited in claim 19, in which:

the first location is at the juncture of the pre-processing portion and the separator portion; and the second location is within the separator portion.

21. A sand separator system as recited in claim 15, in which the pre-processing member comprises a continuous helical member extending inwardly from an interior wall of the barrel member.

22. A sand separator system as recited in claim 15, in which each of the plurality of separator members is a helical member extending inwardly from an interior wall of the barrel member.

23. A sand separator system as recited in claim 22, in which each of the helical members are offset from each other to define the separator gaps.

24. A sand separator system as recited in claim 22, in which each pair of adjacent helical members are arranged along separate helical paths to define the separator gaps.

25. A sand separator system as recited in claim 15, in which:

the pre-processing member comprises a continuous helical member extending inwardly from an interior wall of the barrel member; and each of the plurality of separator members is a helical segment extending inwardly from an interior wall of the barrel member.

26. A sand separator system as recited in claim 25, in which the helical member and the helical segments extend radially inwardly towards the processing axis A.

27. A sand separator system as recited in claim 15, in which a leading edge of a first separator member is spaced from a trailing edge of a second separator member adjacent to the first separator member.

28. A sand separator system as recited in claim 15, further comprising:

a guide member, where a first portion of the guide member is supported by the within the feed portion of processing chamber and a second portion of the guide member is supported outside of the processing chamber adjacent to the feed portion of the processing chamber; and at least one auger member, where the guide member supports auger member adjacent to the feed portion of the processing chamber; wherein as the barrel member rotates about the processing axis A, the at least one auger member transports at least a portion of the raw slurry material into the processing chamber through the feed portion such that at least some of the raw slurry material is transported to the separator portion, and at least some of the liquid material in the raw slurry material is allowed to flow back out of the processing chamber through the feed portion.

29. A method of processing raw slurry material comprising particulate material and liquid material to separate the particulate material from the liquid material, the method comprising the steps of:

providing a barrel member defining a processing axis A, a processing chamber defining a feed portion, a pre-processing portion, a separator portion, and an outlet opening;

supporting at least one pre-processing member within the feed portion and the pre-processing portion of the processing chamber; and supporting a plurality of separator members within the separator portion of the processing chamber such that the plurality of separator members define at least one separator gap;

rotating the barrel member about the processing axis A1 such that the at least one pre-processing member transports at least a portion of the raw slurry material from the feed portion to the separator portion through the pre-processing portion such that at least some of the particulate material in the raw slurry material is transported to the separator portion, and at least some of the liquid material in the raw slurry material is allowed to flow back towards the feed portion, and the plurality of separator members transport at least a portion of the raw slurry material from the pre-processing portion to the outlet opening through the separator portion such that at least some of the particulate material in the raw slurry material is transported to the outlet opening, and at least some of the liquid material in the raw slurry material is allowed to flow back towards the pre-processing portion through the at least one separator gap.

30. A method as recited in claim 29, further comprising the step of arranging introducing rinse fluid into the processing chamber.

31. A method as recited in claim 29, further comprising the steps of:

introducing a first rinse fluid into the processing chamber at a first location; and introducing a second rinse fluid into the processing chamber at a second location.

32. A method as recited in claim 31, in which the first rinse fluid is recovered liquid and the second rinse fluid is fresh water.

33. A method as recited in claim 32, in which the first location is between the feed portion and the second location.

34. A method as recited in claim 33, in which:

the first location is at the juncture of the pre-processing portion and the separator portion; and the second location is within the separator portion.

35. A method as recited in claim 29, further comprising the steps of:

supporting a guide member such that a first portion of the guide member the within the feed portion of processing chamber and a second portion of the guide member outside of the processing chamber adjacent to the feed portion of the processing chamber; and supporting an auger member adjacent to the feed portion of the processing chamber; wherein as the barrel member rotates about the processing axis A, the at least one auger member transports at least a portion of the raw slurry material into the processing chamber through the feed portion such that at least some of the raw slurry material is transported to the separator portion, and at least some of the liquid material in the raw slurry material is allowed to flow back out of the processing chamber through the feed portion.

* * * * *